United States Patent [19]

Schimitschek et al.

[11] 3,891,569
[45] June 24, 1975

[54] LASING DYES

[75] Inventors: Erhard J. Schimitschek, San Diego; John A. Trias, LaMesa; John E. Celto, San Diego, all of Calif.

[73] Assignee: The United States of America as represented by the Secretary of the Navy, Washington, D.C.

[22] Filed: Feb. 11, 1974

[21] Appl. No.: 441,720

[52] U.S. Cl............252/301.2 R; 260/343.2 R; 331/94.5 L
[51] Int. Cl.²................ C09K 11/00; H01S 3/00
[58] Field of Search....... 252/301.2 R; 260/343.2 R; 331/94.5 L

[56] References Cited
UNITED STATES PATENTS

| | | | |
|---|---|---|---|
| 2,647,133 | 7/1953 | Sidney et al. | 260/343.2 |
| 2,844,594 | 7/1958 | Sidney et al. | 260/343.2 |
| 3,030,383 | 4/1962 | Schoen | 260/343.2 |
| 3,322,794 | 5/1967 | Haeberli | 260/343.2 |
| 3,449,372 | 6/1969 | Marcus | 260/343.2 |
| 3,521,187 | 7/1970 | Snavely et al. | 331/94.5 |
| 3,553,235 | 1/1971 | Kircher et al. | 260/343.2 |
| 3,736,524 | 5/1973 | Drexhage | 331/94.5 |
| 3,771,065 | 11/1973 | Goldberg et al. | 331/94.5 L |
| 3,808,232 | 4/1974 | Hardt et al. | 260/343.2 R |

OTHER PUBLICATIONS
J. Chem. Soc. Pg 3235–3238 (1951)
IEEE J. Quantum Electron. 9(7) 781–782 (1973). (Chem. Abstr. 79, 127358j

*Primary Examiner*—John H. Mack
*Assistant Examiner*—Aaron Weisstuch
*Attorney, Agent, or Firm*—R. S. Sciascia; G. J. Rubens; J. W. McLaren

[57] ABSTRACT

A dye comprising a 7-amino coumarin compound having a trifluoromethyl group in the 4-position is dissolved in a liquid solvent for use as a lasing material. The compound may take the form of 7-diethylamino-4-trifluoromethylcoumarin, preferably dissolved in the liquid solvent p-dioxane. These compositions have been found to lase in the blue-green spectral region at approximately 481 nm wavelength, exhibiting greatly improved stability, particularly diminished photodecomposition under continuous high intensity, pulsed excitation conditions, as contrasted to previously known comparable liquid dye laser materials.

5 Claims, 2 Drawing Figures

LASING DYES

BACKGROUND OF THE INVENTION

Lasers capable of emission in the blue-green spectral region are of considerable importance in applications which involve underwater communications, surveillance, viewing, range gating, etc. Such underwater optical systems generally require high energy outputs in the blue-green spectral region, more specifically within the range of 4600 to 4900A where ocean waters impose minimum attenuation and thus permit the greatest transmissivity of light energy with resultant increased efficiency of the system's operation.

A number of U.S. Pat. such as Nos. 2,647,133 issued to Robert Sidney et al. on July 28, 1953; 2,844,594 issued to Robert Sidney et al. on July 22, 1958; 3,030,383 issued to Geza Schoen et al. on Apr. 17, 1962; 3,322,794 issued to Jorg Haeberli on May 30, 1967; and 3,449,372 issued to E. Marcus et al. on June 10, 1969 disclose various types of coumarin dyes useful for many purposes other than lasing action. U.S. Pat. No. 3,521,187, issued July 21, 1970 to Benjamin B. Snavely, Otis G. Peterson, and Raymond F. Reithel disclosed numerous coumarin dyes of the substituted 7-hydroxycoumarin type which are capable of lasing action.

Two commercially available coumarin derivatives, 7 diethylamino-4 methylcoumarin, and Coumarin 102, when dissolved in a suitable solvent, were found to have lasing capabilities in the desired blue-green spectral region.

However, it was found that the commercially available coumarin dyes deteriorated in time by reason of photo-chemical decomposition and bleaching when they were operated under repetitive flashlamp excitation as required for practical device application. This type of photo bleaching has been measured and reported by E. P. Ippen, C. V. Shank and A. Dienes, "Rapid Photobleaching of Organic Laser Dyes in Continuously Operated Devices," IEEE J. Quantum Electron., vol. 7, 1971, pp. 178-179 and also by D. Beer and J. Weber, "Photobleaching of Organic Laser Dyes," Opt. Comm., vol. 5, 1972, pp. 307-309, and it will be apparent to one skilled in the art that such deterioration is highly undesirable because it necessarily causes a significant decrease in the efficiency of any optical system in which such laser emission is employed as the principal source of light energy.

Accordingly, it is highly desirable that a liquid dye laser composition be devised that is capable of the required emission in the blue-green spectral region, but which is less susceptible to deterioration through photo-decomposition and bleaching caused by excitation over a period of time.

SUMMARY OF THE INVENTION

The present invention comprises an improved liquid lasing composition consisting essentially of a 7-amino coumarin compound having a trifluoromethyl group in the 4-position and dissolved in a liquid solvent. It has been found that the 7-amino coumarin compound may comprise either 7-diethylamino-4-trifluoromethylcoumarin or 7-dimethylamino-4-trifluoromethylcoumarin, preferably dissolved in the solvent p-dioxane. These preferred liquid laser compositions have been found to be less susceptible to deterioration by reason of photo-chemical decomposition and bleaching under repetitive, extended, flash lamp excitation.

Thus, the liquid laser composition of the present invention is a significant improvement over comparable prior known coumarin dye compositions which desirably were capable of laser emission in the blue-green spectral region, but unfortunately exhibited more rapid deterioration under operative conditions.

Accordingly, it is an object of the present invention to provide a liquid lasing composition capable of providing emission in the blue-green spectral region, and is also significantly more stable than comparable prior art liquid lasing compositions.

Another most important object of the present invention is to provide a new liquid lasing solution which is less subject to deterioration by reason of photo-chemical decomposition and bleaching caused by flash excitation.

Yet another most important object of the present invention is to provide a liquid lasing solution having significantly improved stability under operative flash excitation conditions, and products formed over an extended period of such operation.

Another most important object of the present invention is to provide a liquid lasing composition capable of emission in the desired blue-green spectral region and exhibiting improved stability of several orders over comparable known liquid lasing compositions.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
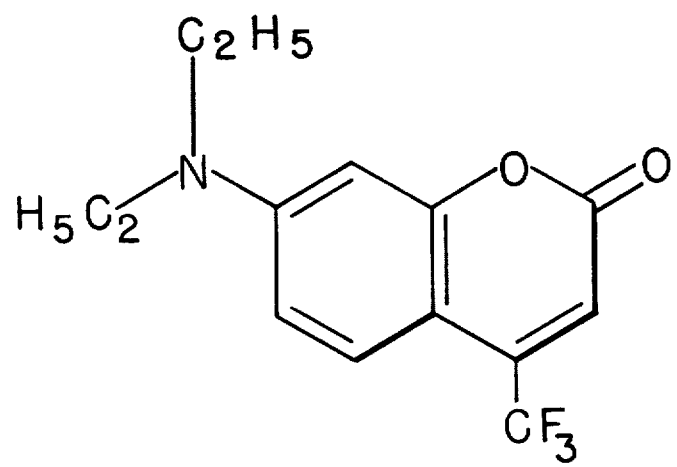
FIG. 1 is a graphical representation of the composition of one of the dyes comprising 7-diethylamino-4-trifluoromethylcoumarin which may be employed in the new liquid lasing composition.
Figure 2:
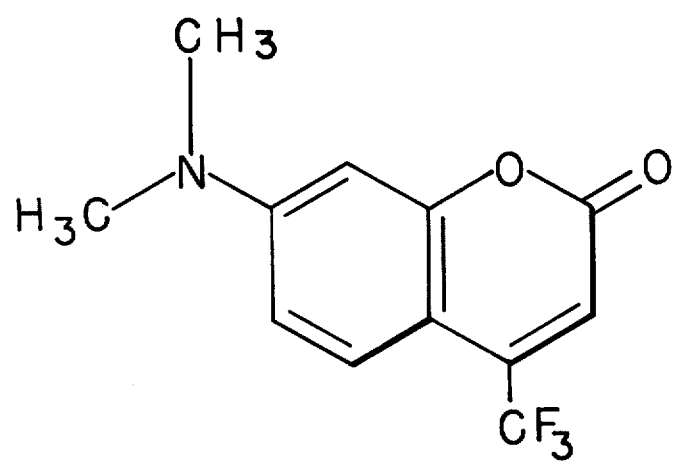
FIG. 2 is a graphical representation of the chemical composition of an alternative form of dye comprising 7-dimethylamino-4-trifluoromethylcoumarin which may be employed in the new liquid laser composition.

The new liquid lasing composition comprises a dye in the form of a 7-amino coumarin compound having a trifluoromethyl group in the 4-position and dissolved in a suitable liquid solvent. The compound may comprise 7-diethylamino-4-trifluoromethylcoumarin or 7-dimethylamino-4-trifluoromethylcoumarin and the preferred liquid solvent has been found to be p-dioxane, although other solvents may be employed.

Liquid solutions of the above described fluorinated amino coumarins have been found to be capable of emitting laser energy in the desired blue-green spectral region at approximately 481 nm, which is within the desired spectral range for use with underwater optical systems.

Lasing of these liquid dye laser materials was achieved by circulating a 500 ml volume through a laser system involving contact only with TEFLON, quartz, nickel, and stainless steel. The solution was maintained at 15°C and flash lamp pumped, using 5 joule pulses and a 20Hz rate into a water-cooled commercially available flash lamp. The water cooling jacket of the flash lamp was fabricated of fused quartz, and no filters were used to cut off any portion of the UV spectrum of the Xenon flash lamp. The operative performance of the new dye laser composition was compared to that of the two commercially available coumarin dye materials previously mentioned, i.e., 7 diethylamino-4-methylcoumarin and Coumarin 102. A solution of these two commercially available coumarins was prepared employing the solvent ethanol. The performance of the resultant compositions was observed under the same conditions as the new liquid dye laser composition comprised of 7 diethylamino-4-trifluoromethylcoumarin dissolved in p-dioxane. In conducting these comparisions the initial peak power of a fresh solution was employed as a reference and then the number of shots were recorded until the original intensity of the material was reduced to one-half. Several runs were made with each dye solution and the averaged results are listed in Table I below

TABLE I

| Dye | Solvent | Concentration [M] | Peak Power Out for 5J Input (KW) | Number of Shots to 50% Decline of Initial Peak Power | $\lambda_{max}$,Untuned (nm) |
|---|---|---|---|---|---|
| *I | ethanol | $7.5 \times 10^{-4}$ | 2.7 | $7 \times 10^3$ | 460 |
| *II | ethanol | $7.5 \times 10^{-4}$ | 4.1 | $5 \times 10^3$ | 480 |
| *III | p-dioxane | $7.5 \times 10^{-4}$ | 3.8 | $3 \times 10^5$ | 481 |

*I 7-diethylamino-4-methylcoumarin
*II Coumarin 102
*III 7-diethylamino-4-trifluoromethylcoumarin It should be noted that whereas the initial peak power varies less than a factor of two between the three dye solutions, the stability of the new dye solution in p-dioxane is almost two full orders of magnitude better than either of the other two dye solutions. Using for example, 5 liters of the new dye laser solution, 3,000,000 shots at the power level given in Table I above can be expected, which represents a significantly improved stability. This advantage of extended usefulness is quite attractive and highly desirable for practical device applications. Most flashlamps would require replacement by or before such time as three million shots had been completed, and therefore the liquid dye laser solution could be conveniently replenished and changed at the same time its source of flashlamp excitation would require replacement.

Since the new dye material 7-diethylamino-4-trifluoromethylcoumarin is not known to be commercially available, its snythesis procedure is briefly described hereafter. The reaction is based on the condensation of 8-ketonic esters with monohydric phenols as described in the publication by H. V. Pechmann and M. Schaal, "Studien Ueber Cumarine II," Ber., vol. 32, 1899, pp. 3690-3696.

6 gr of m-diethylamino phenol and 8 gr of ethyltrifluoroacetoacetate were refluxed in 30 ml of ethanol for 15 hours with 6 gr of anhydrous zinc chloride as a condensing agent. The resultant reaction product was stirred into 1.5 liters of water, acidified with 30 ml of concentrated HCl.

After 12 hours, the precipitated solid was collected on a glassfritted filter and washed with water several times. This crude product was purified by vacuum sublimation and finally recrystallized from absolute methanol. The yield is 40%. The material consists of feathery, yellow-green crystals with M.P. 79°-81°C.

Analysis: Calculated: C,59%; H,4.9%; N,4.9%; F,20%. Found: C,58.9%; H,4.8%; N,4.9%; F,18%.

The preparation of 7-dimethylamino-4-trifluoromethylcoumarin follows substantially the same procedure except that m-dimethylaminophenol was substituted for m-diethylamino-phenol. The resultant material consisted of yellow-green, well defined platelets with M.P. 144°-146°C.

Analysis: Calculated: C,59%; H,4.9%; N,4.9%; F,20%. Found: C,58.9%; H,4.8%; N,4.9%; F,18%.

As can readily be seen from the tabulated data recording operation of the new lasing composition as compared with the performance of comparable prior art lasing compositions under the same conditions, the present invention obviates several disadvantages which had inhered in the operation of the comparable prior art liquid lasing solutions.

Most significantly, the new liquid lasing composition has proven to be markedly more stable and much less subject to photo-chemical decomposition such as may be due either to the passage of time or to extended flash excitation during the lasing process, or both.

Obviously many modifications and variations of the present invention are possible in the light of the above teachings. It is therefore to be understood that within the scope of the appended claims the invention may be practiced otherwise than as specifically described.

What is claimed is:

1. A liquid dye laser composition comprising a 7-amino coumarin compound having a trifluoromethyl group in the 4-position and dissolved in a low polar, non-quenching liquid solvent.

2. A liquid dye laser composition as claimed in claim 1 wherein said compound comprises 7-diethylamino-4-trifluoromethylcoumarin.

3. A liquid dye laser composition as claimed in claim 1 wherein said compound comprises 7-dimethylamino-4-trifluoromethylcoumarin.

4. A liquid dye laser composition as claimed in claim 2 wherein said liquid solvent is p-dioxane.

5. A liquid dye laser composition as claimed in claim 3 wherein said liquid solvent is p-dioxane.

* * * * *